(12) United States Patent
Tuoriniemi

(10) Patent No.: US 11,850,838 B2
(45) Date of Patent: Dec. 26, 2023

(54) 3-FABRIC LAYER INSULATION MATERIAL AND A METHOD AND AN ARRANGEMENT FOR PRODUCING THE SAME

(71) Applicant: Origopro Oy, Helsinki (FI)

(72) Inventor: Veijo Tuoriniemi, Espoo (FI)

(73) Assignee: ORIGOPRO OY, Helsinki (FI)

( * ) Notice: Subject to any disclaimer, the term of this patent is extended or adjusted under 35 U.S.C. 154(b) by 88 days.

(21) Appl. No.: 17/586,315

(22) Filed: Jan. 27, 2022

(65) Prior Publication Data

US 2022/0143953 A1 May 12, 2022

Related U.S. Application Data

(62) Division of application No. 16/608,216, filed as application No. PCT/FI2018/050319 on May 2, 2018, now Pat. No. 11,267,222.

(30) Foreign Application Priority Data

May 4, 2017 (FI) ...................................... 20175390

(51) Int. Cl.
*B32B 7/05* (2019.01)
*A41D 31/06* (2019.01)
(Continued)

(52) U.S. Cl.
CPC .............. *B32B 7/05* (2019.01); *A41D 31/065* (2019.02); *B29C 65/1612* (2013.01); *B32B 3/28* (2013.01);
(Continued)

(58) Field of Classification Search
CPC .. A41D 31/065; A47G 9/0207; A47G 9/0223; A47G 9/086; B29L 2031/48;
(Continued)

(56) References Cited

U.S. PATENT DOCUMENTS

| 1,421,906 A | 7/1922 | Calef |
| 2,607,104 A | 8/1952 | Foster |

(Continued)

FOREIGN PATENT DOCUMENTS

| CN | 201785576 U | 4/2011 |
| CN | 105283089 A | 1/2016 |

(Continued)

OTHER PUBLICATIONS

Japanese Office Action for Japanese Patent Application No. 2020-512089 dated May 27, 2022.
(Continued)

*Primary Examiner* — Philip C Tucker
*Assistant Examiner* — Brian R Slawski
(74) *Attorney, Agent, or Firm* — Thomas | Horstemeyer, LLP

(57) ABSTRACT

This invention describes a 3-layer insulation material comprising a first fabric layer, a second fabric layer and a third fluted intermediate fabric layer between the first and the second fabric layers, the fluted intermediate fabric layer being attached alternately to the first and the second fabric layer with longitudinal seams forming longitudinal channels for the insulation material having individual insulation material bundle inside each longitudinal channel. Also disclosed are a method and an arrangement for producing the same.

5 Claims, 6 Drawing Sheets

Figure 1:
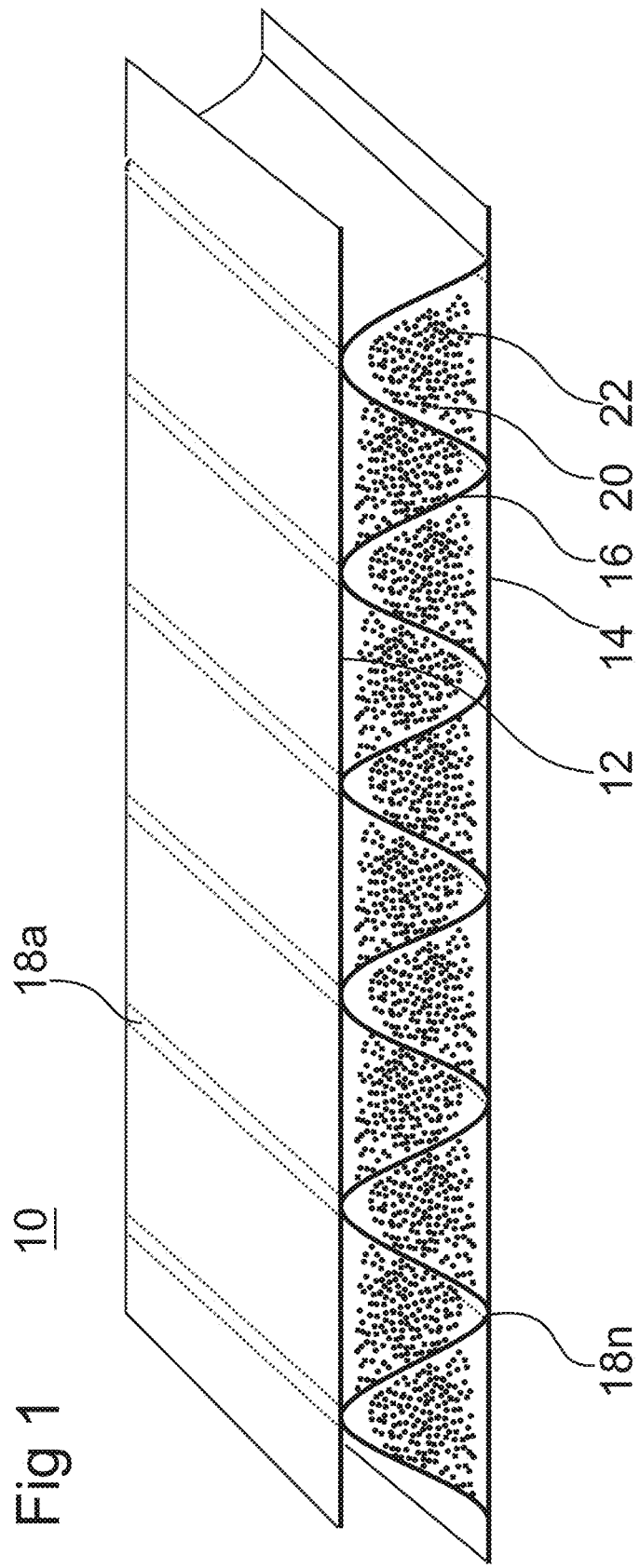

(51) Int. Cl.
  *B32B 3/28*    (2006.01)
  *B32B 5/14*    (2006.01)
  *B32B 5/26*    (2006.01)
  *B32B 37/00*   (2006.01)
  *B29C 65/16*   (2006.01)
  *A47G 9/02*    (2006.01)
  *A47G 9/08*    (2006.01)
  *B29C 65/62*   (2006.01)
  *B29C 65/14*   (2006.01)
  *B29C 65/08*   (2006.01)
  *B29C 65/48*   (2006.01)
  *B29C 65/00*   (2006.01)

(52) U.S. Cl.
  CPC .......... *B32B 5/14* (2013.01); *B32B 5/26* (2013.01); *B32B 37/0076* (2013.01); *A47G 9/0223* (2013.01); *A47G 9/086* (2013.01); *B29C 65/08* (2013.01); *B29C 65/14* (2013.01); *B29C 65/16* (2013.01); *B29C 65/48* (2013.01); *B29C 65/62* (2013.01); *B29C 66/1122* (2013.01); *B29C 66/438* (2013.01); *B29C 66/83221* (2013.01); *B29C 66/8432* (2013.01); *B32B 2307/304* (2013.01); *B32B 2437/00* (2013.01)

(58) Field of Classification Search
  CPC ........ B29C 65/08; B29C 65/14; B29C 65/16; B29C 65/1612; B29C 65/1635; B29C 65/1658; B29C 65/1661; B29C 65/1664; B29C 65/1667; B29C 65/1683; B29C 65/1696; B29C 65/48; B29C 65/62; B29C 66/1122; B29C 66/438; B29C 66/81267; B29C 66/8242; B29C 66/83221; B29C 66/83441; B29C 66/8432; B29C 66/8122; B32B 2307/304; B32B 2437/00; B32B 3/28; B32B 37/0076; B32B 5/04; B32B 5/14; B32B 5/26; B32B 7/05
  USPC ............ 156/60, 65, 70, 93, 228, 272.8, 292, 156/308.2, 308.4, 309.6, 324, 278, 279, 156/349, 379.6, 379.8, 380.6, 380.9, 383, 156/443, 459, 461, 462, 470, 471, 538, 156/539, 543, 547, 549; 428/71, 101, 428/182; 112/428; 139/384 R; 2/456, 2/243.1, 272, 93
  See application file for complete search history.

(56) References Cited

U.S. PATENT DOCUMENTS

| | | | |
|---|---|---|---|
| 2,737,227 | A | 3/1956 | Brummel |
| 3,123,838 | A | 3/1964 | Wilson |
| 3,805,720 | A | 4/1974 | Hunt |
| 3,933,549 | A | 1/1976 | Heimann et al. |
| 3,951,717 | A | 4/1976 | Herweg et al. |
| 4,565,468 | A | 1/1986 | Crawford |
| 4,740,256 | A | 4/1988 | Vosberg |
| 5,713,079 | A | 2/1998 | Simon et al. |
| 5,976,665 | A | 11/1999 | Hansson |
| 6,939,425 | B1 | 9/2005 | Joensson et al. |
| 2003/0059581 | A1* | 3/2003 | Whalen ............... B32B 15/14 428/182 |
| 2003/0224146 | A1 | 12/2003 | Raidel et al. |
| 2004/0170810 | A1 | 9/2004 | Rasmussen |
| 2007/0293112 | A1* | 12/2007 | Hanson ................ D04H 1/559 156/60 |
| 2008/0242175 | A1 | 10/2008 | Narayanan et al. |
| 2010/0009126 | A1 | 1/2010 | Leon et al. |
| 2010/0086730 | A1 | 4/2010 | Lo et al. |
| 2012/0006471 | A1 | 1/2012 | Cik |
| 2014/0250575 | A1 | 9/2014 | Man |
| 2014/0349057 | A1 | 11/2014 | Blackford et al. |
| 2014/0363636 | A1 | 12/2014 | Gubler et al. |
| 2017/0043567 | A1 | 2/2017 | Gubler et al. |

FOREIGN PATENT DOCUMENTS

| | | |
|---|---|---|
| DE | 102015002623 A1 | 7/2016 |
| GB | 1390609 A | 4/1975 |
| JP | 2014028501 A | 2/2014 |
| JP | 2014237315 A | 12/2014 |
| WO | 2013010004 A2 | 1/2013 |
| WO | 2014190319 A1 | 11/2014 |

OTHER PUBLICATIONS

Finnish Patent and Registration Office, Search Report of Finnish patent application No. 20175390, dated Oct. 27, 2017, 1 page.
Office Action and Search Report, China Patent Application No. 2018800290068, dated May 21, 2021.

* cited by examiner

3-FABRIC LAYER INSULATION MATERIAL AND A METHOD AND AN ARRANGEMENT FOR PRODUCING THE SAME

CROSS-REFERENCE TO RELATED APPLICATIONS

This application is a divisional application of and claims priority to U.S. patent application Ser. No. 16/608,216, filed on Oct. 25, 2019, now U.S. Pat. No. 11,267,222, which claims priority to and the benefit of U.S. national application of the international application number PCT/FI2018/050319 filed on May 2, 2018, which claims priority to and the benefit of Finnish application FI20175390, filed on May 4, 2017, the entire contents of all of which are incorporated herein by reference.

Disclosed invention relates to a 3-fabric layer thermal insulation material with corrugated middle layer wherein a multiplicity of sliver insulation is guided individually to multiplicity of fabric length wise running corrugated bundle channels. Insulation is not attached to fabric but is floating in bundle channels merely by friction between insulation and fabric walls. Insulation is specially designed for garment, quilts, sleeping bags and the like. Also disclosed are a method and an arrangement for producing the same.

In U.S. Pat. No. 2,607,104 is described a corrugated two-ply and three-ply fabric a highly resilient for lateral compression. Elastic resistance of this fabric to lateral compression is described to provide cushioning comparable to sponge rubber. The three-ply fabric comprises a top fabric, bottom fabric and much stiffer intermediate fabric which is woven on a single operation. In order to form three dimensional shapes the top and bottom fabrics are shrunk by heat treatment. Non-shrinking intermediate layer will form a corrugated fabric layer. In order to open the channels for filling the shrinking process must be done after weaving. Therefore, if industrially possible at all, the filling would be a separate operation for the insulation material after weaving and shrinking of the fabrics. However the material disclosed in the document is constructed to keep corrugated passages open by stiffer intermediate layer even under substantial pressure. Producing three layer fabrics is also uneconomical and if any insulation is introduced to the process it should be done in weaving process, which is not found in description.

Insulating properties could be increased by filling corrugated channels with insulating fibers. U.S. Pat. No. 2,607,104 suggests to fill strands with blowable rubber-like material like vinyl chloride strips which would expand under heat and fill the channels or alternatively use glass fibers. Even if the document suggests filling the channels with insulating material it does not provide information how to do it industrial manner nor suggest that material would be suitable for garment making.

GB 1,390,609 describes a thermal insulating material which has two layers of sheet material with two sheets of insulating material each insulating material attached by stiches to on one of the layers forming a composite insulation material. The corrugated, e.g. grooved, surfaces are coupled together with peaks of corrugation, which on one section are dispersed in the folds of corrugations of the other sections so that the lines of stitching in one section do not overlap those in the other section whereby the two sections together provide a composite insulation material having a uniform insulation over the width of the material without cold bridges caused by needle holes. However insulation material is missing a third intermediate fabric layer which would couple the two layers of sheet material together and provide additional air-seal layer. In its simplest form the insulation is merely two ordinary quilted insulation material placed together back to back and kept together merely with natural adhesion and surface irregularities.

An apparatus manufactured by applying the alternate quilting method has been disclosed in US 2014-0250575A. Multiple layers may be arranged in layer sets, the layers of each layer set may be quilt-stitched to each other, and as a result, stitches may be formed. A space between the layers of each layer set may be filled with a thermal insulation material. The layer sets may be offset with respect to each other, in order for the stitches of one layer set to be blocked by the area of another layer set abundant with the insulation material, the objective of which is to block flow of cold air from needle holes through the alternate quilting construction. This is expensive solution since two layers of insulation need to be quilted and parts has to be carefully placed in appropriate position related to each other's.

U.S. Pat. No. 3,805,720 describes a quilted construction with special seam construction, i.e. inwardly turned tuck which would preclude abrasion, snagging, pulling the stitching line. Sewing of this construction can only be done by individually sewn every seam and is not applicable for production by quilting machine.

WO 2014/190319 A1 discloses insulating materials including a lining material layer, a face material layer, at least one layer of continuous synthetic insulation disposed between the lining material layer and the face material layer, fill is disposed between the lining material layer and the face material layer, one or more first seams are coupling the lining material layer and the at least one layer of continuous synthetic insulation, and one or more second seams are coupling the face material layer and the at least one layer of continuous synthetic insulation. The first and second seams form two or more baffles partitioning the fill in the insulating material. The document describes a continuous insulation layer which is traditional sheet material. Face material layer is to be attached to insulation layer by stitching, welding or clueing i.e. bonding with adhesive. Additional second insulation material is added between insulation material and face material layer and insulation material and lining layer. For example a fill, e.g. feathers aerogel, wool or flannel is disposed between the face material layer and lining material layer or between. Continuous insulation layer may be stabilizing the positioning of the additional second insulation material, i.e. fill, reducing the loose fill migration. This document does not disclose how the additional second layer e.g. down is added. Traditionally the down is tucked by hand to every compartment filing one compartment at time which is labor consuming and expensive.

U.S. Pat. No. 5,713,079 A presents an insulated garment wherein the first layer of insulation is sewn to the first fabric layer and second layer of insulation is sewn to second fabric layer by stitching. There may be a lining layer on back side of both insulation layers. Insulation layers are displaced so that midpoint of array of stitching covers the array of needle holes of the counterpart insulation layer. The insulation comprises goose down on first layer and second layer is made of synthetic material. Object of invention is to get beneficial effect of both materials. When using this type of insulation the garment need to be uniquely configured to have midpoint of first insulation layer to cover stitching of second insulation layer. Since user have several different body types the garment may hang freely or may need to contour to cover the torso shape. The position of outer layer related to inner layer will variate greatly thus resulting displacement of insulation.

In garment manufacturing there are two elements that are important in protecting from the cold: stopping the wind from penetrating and maintaining the layer of warm air close to the body by the use of fibers to create a layer of still air which serves as an insulation.

Air is commonly used non-conducting insulator. A window's thermal insulation is improved by increasing window panes and isolating air layers between panes. Window with three window panes have higher insulation than window with two panes. Therefore having three fabric layers in garment insulates better than garment with only two layers of fabric.

The present invention describes a material with three layers of fabric; each layer has substantially low air permeability, preventing air from traveling through fabric layers to the next bundle channel. This stops warm air from escaping out of insulation and prevents occupation of cold air inside of insulation. A fiber sliver, e.g. a continuous crimped tow, is inserted to float freely inside bundle channels between fabric layers to keep layers separate, trapping in warm air emitted from the user's body. This solution produces superior insulating abilities over two- or single fabric layer insulation.

Traditionally insulation material in garments is introduced to the quilting machine as sheet material. Insulation is instructed between the face layer and the lining layer and sewn together with an array of needles. Needle holes produce cold bridges, i.e. thermal bridges. Cold bridges form weak spots in the insulation, causing cold air from outside of the garment to migrate inside of the garment. In one embodiment of the invention is used laser welding, which makes it possible to attach two fabric layers together without needle holes. Additionally laser welded seams provide barrier to particles, liquids and gases. The fabrics are welded together from only interconnections, so the surface of the fabric stays intact.

The manufacturing of the continuous insulation sheet material involves specially engineered methods and processes, which adds expenses to the price of insulation. Instead of using traditional sheet material as insulation layer, present invention uses continuous fiber-bundle insulation, i.e. the sliver of fiber, a strand of loose, untwisted rope of fibers, continuous, possibly crimped tow, directly extruded from spinneret as multiplicity of continuous filament strands. The spinneret has tiny holes through which a chemical solution is extruded to produce continuous filaments, as of polypropylene, nylon, or polyester. Multiple fiber filaments form a continuous bundle tow.

The sliver can also be made via a carding process, which forms a lightly coiled, puffy strand of fibers can be a product of the fiber combing process. The sliver could be introduced directly from collection barrels to fill the fabric lengthwise, running longitudinal along bundle channels. The sliver is attached inside of a bundle channel possibly only by friction. Eventually it will be anchored in its place from its longitudinal ends, when the insulating material is cut and sewn to be a garment. This direct method skips the manufacturing processes, which then simplifies whole process making insulation more economical.

Quilting fabric with needles is a slow and a labor intensive process, which has made quilting uneconomical in many parts of the world. The bonding of layers with an adhesive is a process where two or more dissimilar substances are united by molecular force acting in the area of contact. This process requires the melting and cooling of adhesive in production which is a time consuming process. Due to the limited peel strength, the adhesive-bonded seams often delaminate when continuous bending and washing. Laser welding on the other hand is economical and highly productive. Compared to traditional quilting methods by stitching or adhesive bonding, laser welding could easily multifold the speed. Increased production would have a remarkable economic impact.

To produce good quality seams using laser welding requires an infra-red absorbing textile, and another textile which does not absorb infra-red radiation. Laser energy percolates through the non-IR absorbing layer of textile and is absorbed by the underlying IR-absorbing textile. The fabric layers are melted together on a molecular level under pressure from pressure roller. In the laser welding process, the outer surface of the fabric is not affected, only the thin layers of the fabric in interconnection is melted. Therefore, the surface or fabric is not affected.

Alternatively, in other embodiments, ultrasonic seaming could be used, however that method would melt the seam throughout which might be undesirable for some.

Laser-welded seams do not use additional adhesive in the joint. Laser welding results in a joint which has greater flexibility and a softer feel compared to adhesive bonding. The IR-absorbency of the fabric can be reached by having the fabric itself being IR-absorbent. The fabric can also be dyed or printed to be IR-absorbent, or IR-absorbent can be applied to a seam before welding e.g. by spraying. Welding requires equal thermoplastic properties, so therefore e.g. polyester fabric is the most suitable to be welded with polyester; polypropylene with polypropylene; and polyamide with polyamide. Suitable laser welding heads, which can be adopted to use in fabric welding, are developed for example by Leister Technologies AG, CH-6056 Kaegiswil, Switzerland and TWI Ltd, Cambridge, United Kingdom.

Figure 2:
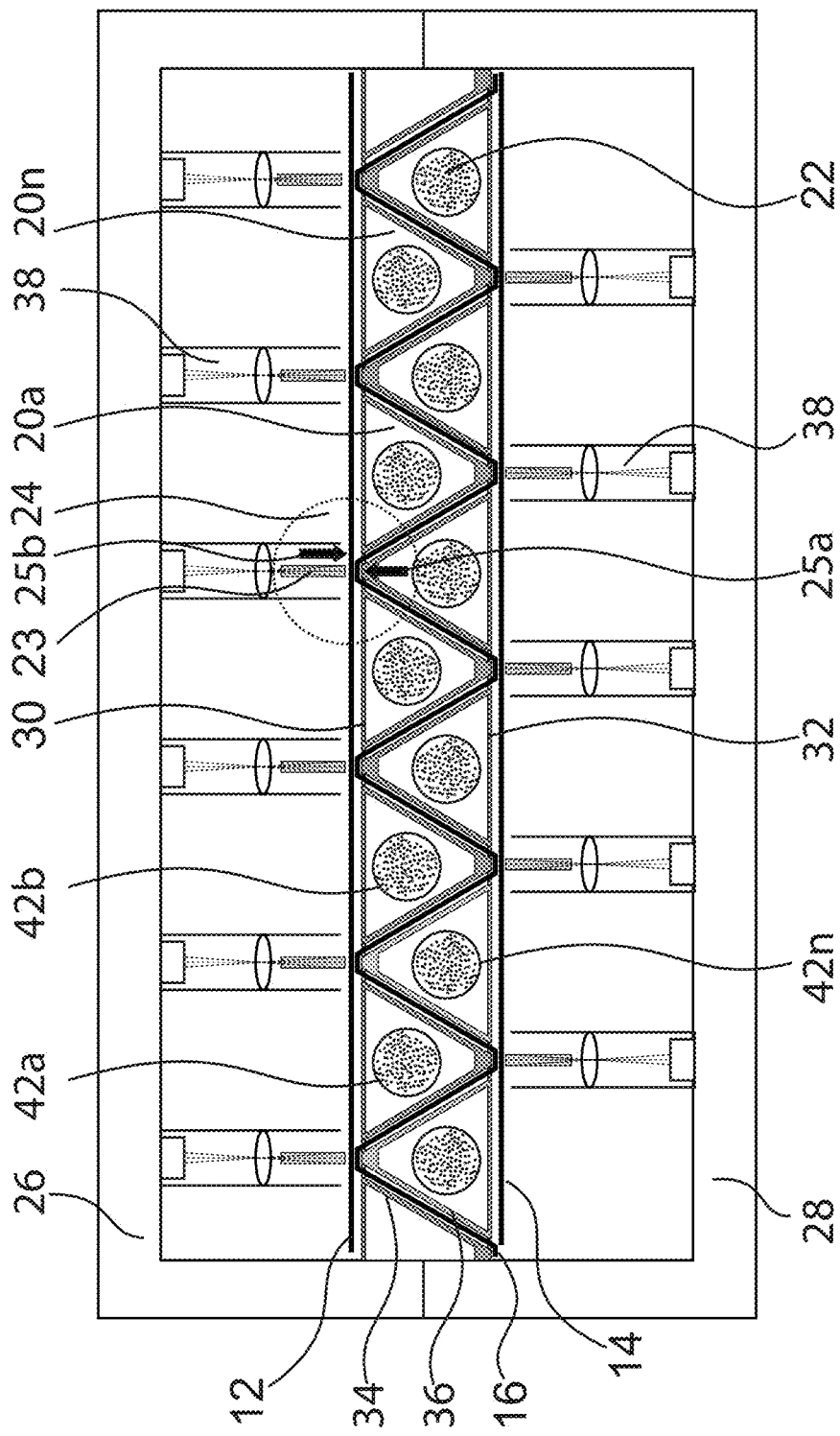
Figure 3:
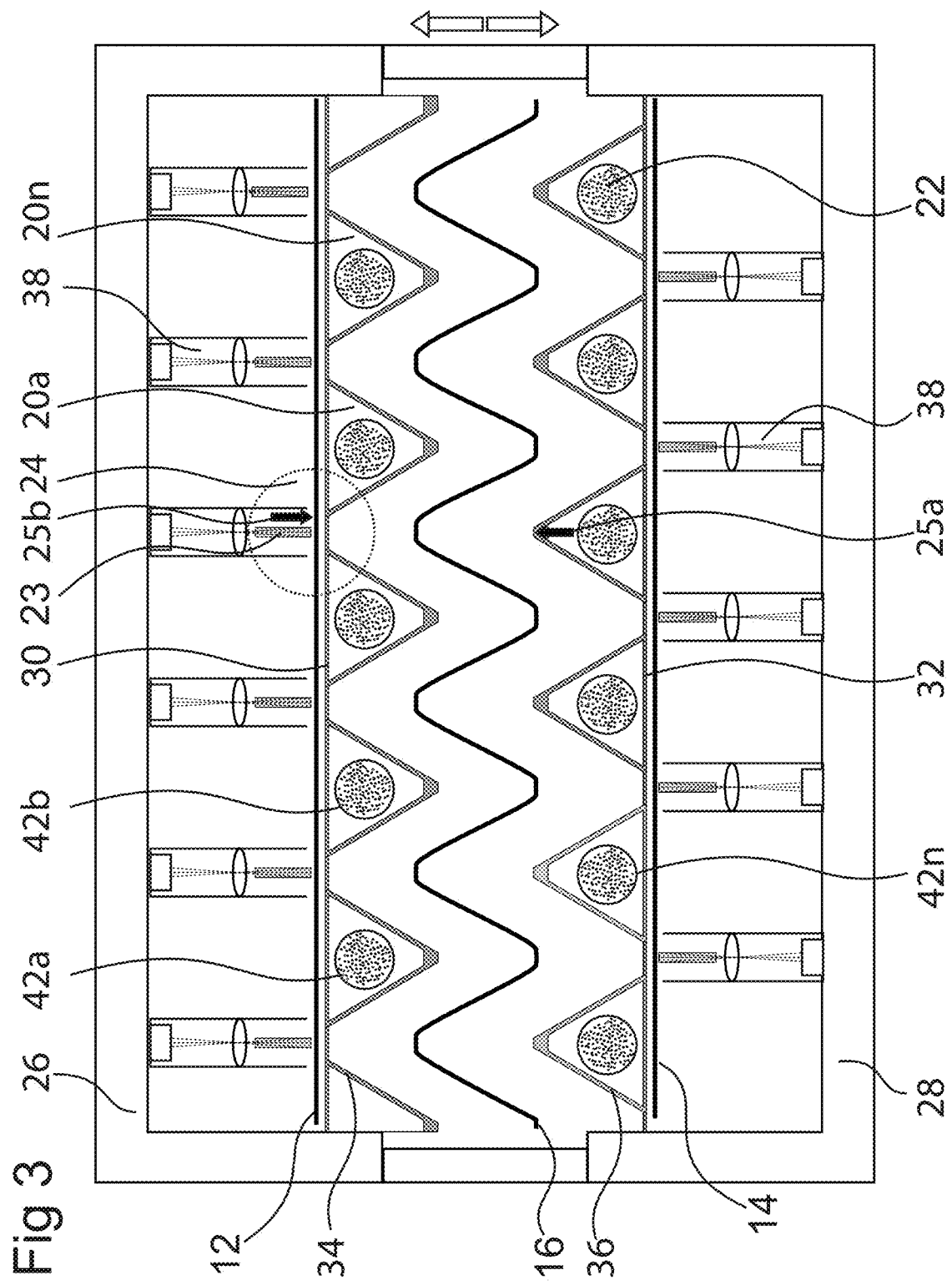
Figure 4:
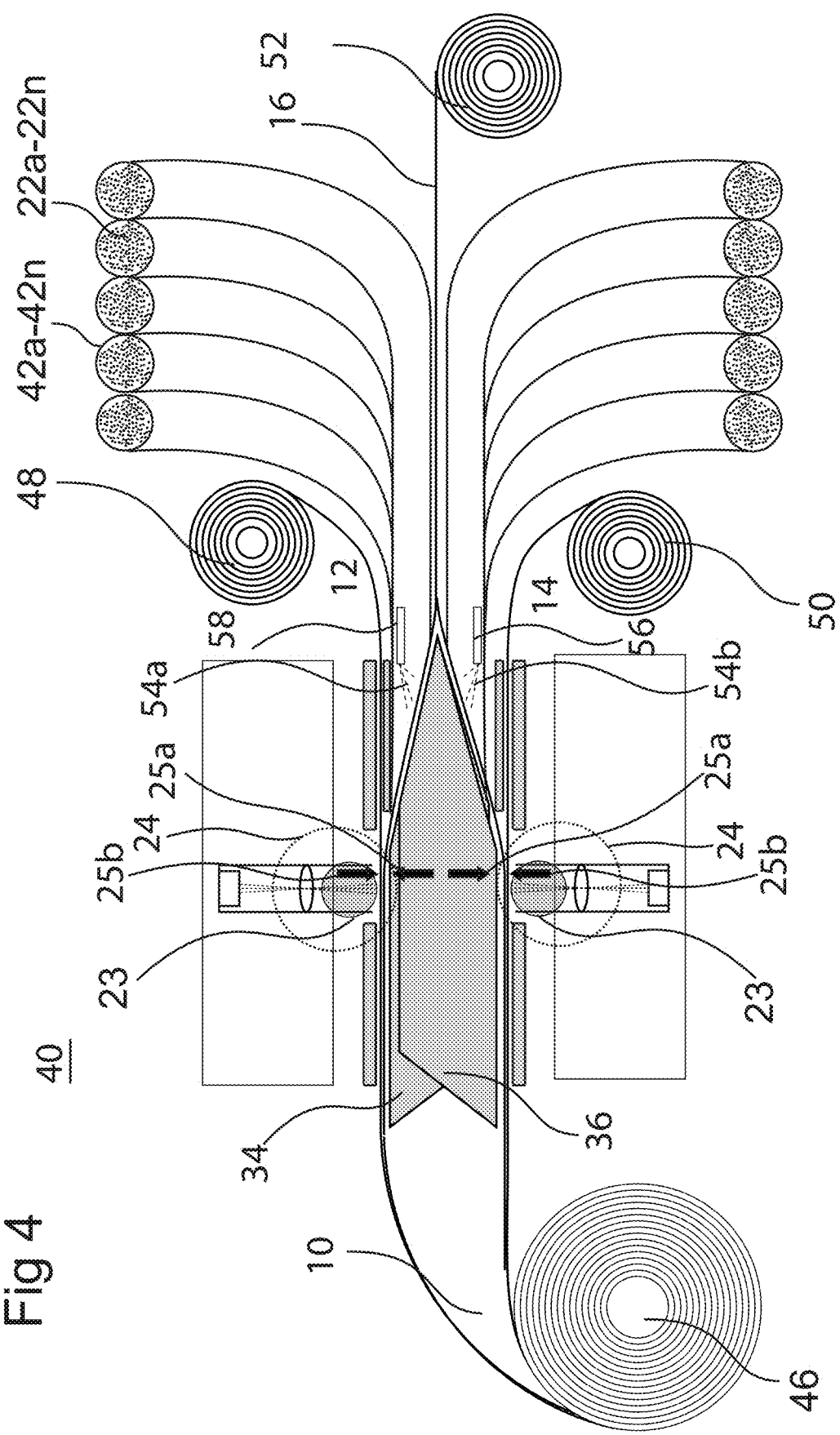
Figure 5:
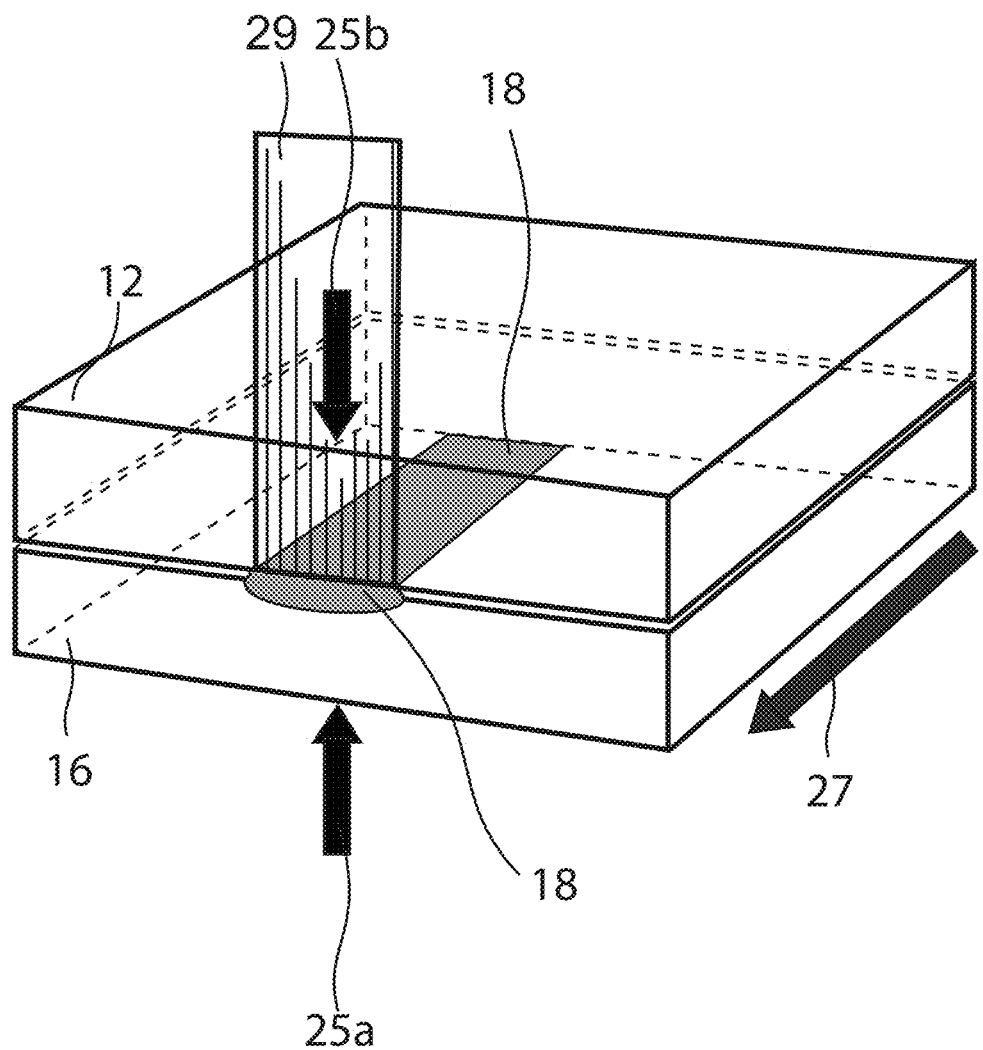
Figure 6:
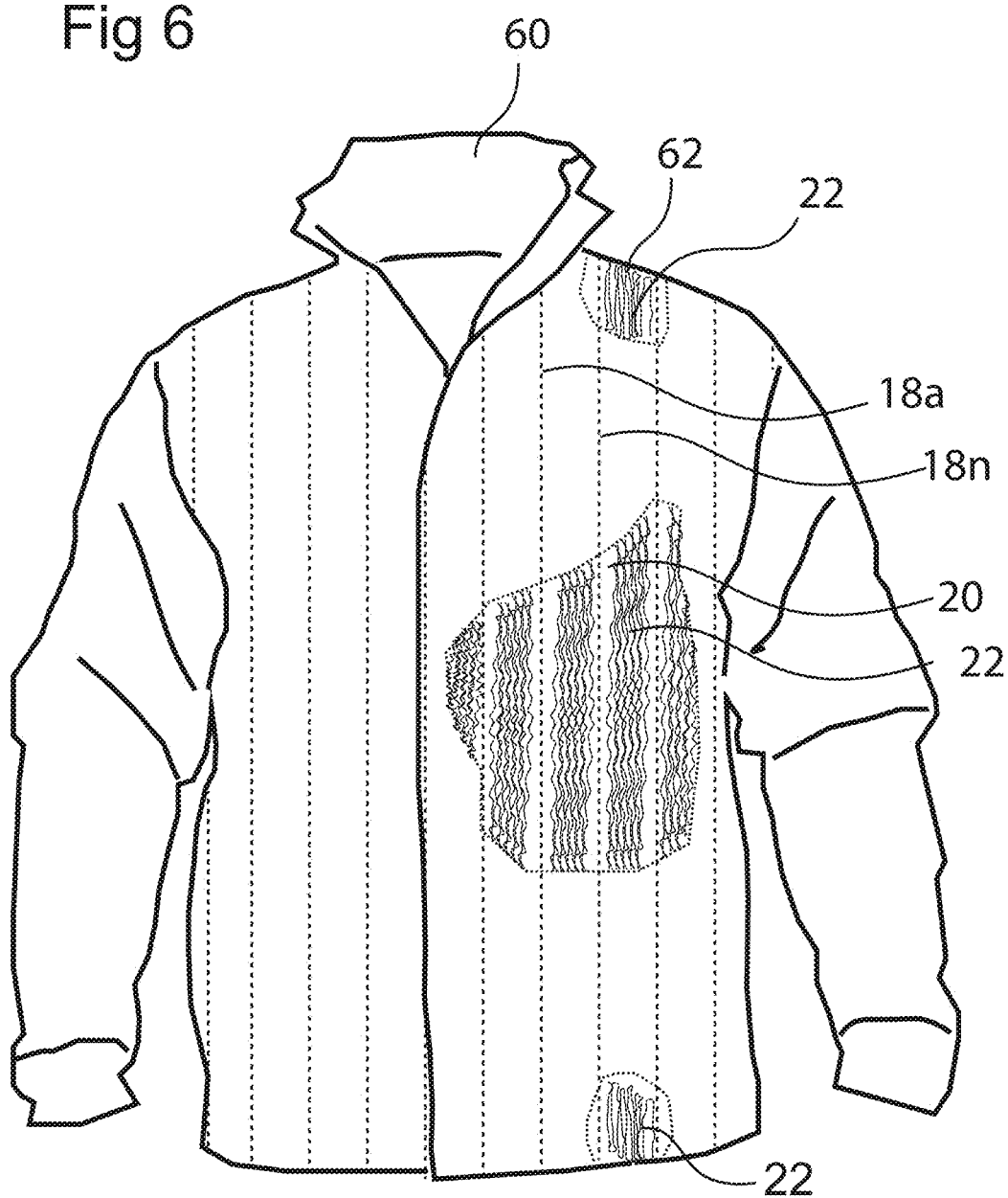

In the following the invention is discussed more precisely referring to drawings where, FIG. 1 shows a cross sectional view of the 3-layer insulation with corrugated middle layer, FIG. 2 shows a cross sectional view of a laser welding machine being able to make corrugated insulation, FIG. 3 shows a cross sectional view of a laser welding machine in open position, FIG. 4 shows a side elevational view of the laser welding machine and the material flow in the machine, FIG. 5 shows a perspective view of a laser welded seam, and FIG. 6 shows a garment and the placement of a piece of insulation material as part of garment.

FIG. 1 shows a cross sectional view of a 3-fabric layer corrugated insulation material 10 with a first fabric layer 12, second fabric layer 14 and fluted third intermediate fabric layer 16 joined together longitudinally by multiplicity of lengthwise welded seams 18a-18n. First fabric layer 12 and third intermediate fabric layer 16, and respectively on reverse side second fabric layer 14 and said third intermediate fabric layer 16 form a plurality of bundle channels 20 which are individually filled with insulation material 22. The fabric layers 12, 14 and 16 can be different type of textile material, e.g. woven, knitted, warp knitted, felt, or nonwoven material.

FIG. 2 shows a laser welding machine 24, which is able to make insulation material 10 (FIG. 1). The machine 24 has an upper frame 26, which houses an upper fabric guide 30 guiding the first fabric layer 12 and a lower frame 28 housing a lower fabric guide 32 guiding the second fabric layer 14. Third fabric layer 16 is directed between upper fluting folder 34 which is attached to said upper frame 26 and a lower fluting folder 36, which is attached to said lower frame 28. Multiplicity of laser sources 38 are attached to said upper frame 26 above multiplicity of welding stations 24a-24n and a multiplicity of laser sources 38 are attached to said lower frame 28 below multiplicity of welding stations 24a-24n.

The multiplicity of said laser sources 38 are shown only symbolically. The function and design of laser welding have already been disclosed in a variety of publications with respect to the laser transmission welding method, which is therefore common knowledge to a person skilled in the art, such that they need not be described in more detail here. Therefore the depiction of the laser light source from which the laser light 38 originates has been omitted.

When the first fabric layer 12, the second fabric layer 14 and the third fabric layer 16 are pulled, rolled or otherwise moved forward, the first layer of fabric and said intermediate layer and on reverse side said second layer of fabric and said intermediate layer are longitudinally melted together on a molecular level by laser sources 38 along seams 18a-18n (FIG. 1). A multiplicity of hollow conduits 42 are installed in front of the folders 34 and 36. Insulation material 22 is simultaneously with welding introduced inside the bundle channels 20 through the conduits 42. Even if the hollow conduit 42 is preferred embodiment also other means can be used to guide insulation tow to cavities/bundle channels 20. Guiding means like rings, channels, ducts and tubes can be used. These all among others are widely used in textile industry and are common knowledge to the person skilled in the art.

FIG. 3 shows a laser welding machine 24 in open position. In this position, the machine can be cleaned and served and the third layer of fabric 16 can be inserted between the upper fluting folder 34 and the lower fluting folder 36.

FIG. 4 shows a side elevational view of the welding machine 40 and the material flow in welding machine. The first fabric layer 12 is introduced to welding machine 40 from roll 48, the second fabric layer 14 is introduced to the machine from roll 50 and the third intermediate layer of fabric 16 is introduced to machine from roll 52. The power source (not shown) is connected to roll 46 and is pulling the insulation material 10 through the machine and storing the insulation material 10 on roll 46. Alternatively other fabric moving methods can be used, including pressure rolls connected to a motor or fabric pullers behind welding frames.

Simultaneously when fabric is moved through the machine, the plurality of bundle channels 20 (FIG. 1) are individually filled with insulation material 22a-22n, introduced through said multiplicity of conduits 42a-42n. The first fabric 12 from roll 48 and the second fabric 14 and the third fabric from roll 52 are introduced between folders 34 and 36, and are welded together longitudinally by a multiplicity of welding stations 24a-24n.

In order to absorb IR-light optimal energy, a laser absorber 54a and 54b can be introduced to fabric in a joint before welding fabric. The absorber can be e.g. sprayed on a weldable part of the fabric layer through nozzles 56 and 58. Commercial IR-absorbers are made by, for example, Centex Corporation under the Clearweld name. An IR absorber can alternatively be included to a polymer solution before extrusion, printed, coated, or otherwise applied on the fabric.

In an embodiment where heat adhesive is used to join the fabric layers the adhesive can be sprayed or other way conducted to the joint area through the nozzles. Adhesive can be in liquid form or it can be applied as continuous filament.

It is also possible to use different laser welding methods for alternative embodiments of the invention. In laser welding, instead of using multiple laser heads to perform multiple contour welded seams there is an option to use only one laser head to produce all the seams simultaneously. There are three main techniques know in industry which could be utilized with current invention:

Diffractive Welding

Diffractive optical element (DOEs) shape and split laser beams in an energy-efficient manner. Diffractive beam splitter, included to the laser source is a single optical element that divides an input beam into N output beams 29. Output beams can be pointed to predetermined positions. The light laser beam 29 is split and simultaneously directed to joint fusion areas 18a-18n with minimal light loss.

Scanner Welding

In scanner welding the beam guidance is performed by using mobile mirrors included to laser source 38. The beam 29 is directed by changing the angles of the mirrors. The beam continuously scans the welding areas 18a-18n at very high speed. The fabrics passing through the welding areas will be melted and fused from the joint areas quasi-simultaneously manner.

Mask Welding

Mask welding method utilizes wide beams that moves over the entire surface being welded. Mask shields are protecting areas where welding is not desired. Predetermined welding seam areas 18a-18n will be melted and fused.

The function, design, use and mode of operation of mask welding, diffractive welding and scanner welding have already been disclosed in a variety of publications of the prior art with respect to the laser transmission welding method, which is known per se, and are therefore common knowledge to the person skilled in the art, such they need not be described in more detail here.

FIG. 5 shows a laser-welded seam, where fabric layer 12 is percolating IR radiation, and where the IR absorbent middle layer of fabric 16 is applied and absorbed with IR radiation 29, then heated, melted and pressed together with pressure 25a and 25b. A controlled amount of heat is applied to the fabric joint. Laser energy passes through the IR percolating fabric layer 12, heats the surface of IR-absorbent fabric layer 16, melts the surface of layer 16, and seals the interface area together under pressure 25, hence forming a welded seam 18, when fabric is moved to direction 27. Pressure is forced between the pressure rollers 23 (FIG. 2 and FIG. 3) and the peaks of the fluting folders 34 and 36 (FIG. 2 and FIG. 3).

In preferred embodiments of the invention the pressure can be applied to the fabric with different methods, such as:

Pressure Plates

In preferred embodiment the fusible fabric layers, 12 and 16 on first side and 14 and 16 on second side, are passing through and pressed between peaks of upper fluting element 34 and IR-transparent pressure plate (not shown) between laser source and first fabric layer on first side and peaks of lower fluting folder 36 and IR-transparent pressure plate (not shown) between laser source and second fabric layer on second side. The guide elements 30 and 32 are located on top of fluting folders and are similar on upper guide elements and lower guide elements. Laser light is applied to the welding positions through the laser light transparent pressure plates.

Pressure Roller

In one embodiment the pressure can be applied by a laser beam transparent glass roller.

Pressure Ball

In one embodiment the pressure can be applied through a laser light transparent sphere which can be supported by air bearing which enables frictionless rotation.

The advantage of employing roller or sphere instead of plate is having less friction and therefore less heat between pressure means and fabric when the fabric is moved thorough the welding station.

Pressure for welding stations can be produced mechanically, or as an alternative, hydrostatically or pneumatically either blowing positive pressure or by suction production procure adhesion and connection of fabrics in welding areas.

The function, design, use and mode of operation of pressure forming, have already been disclosed in a variety of publications of the prior art with respect to the laser transmission welding method, which is known per se, and are therefore common knowledge to the person skilled in the art, such they need not be described in more detail here.

Different pressure sources in context of laser welding are described for example in US patent application US 2014/0363636 A1 for Leister Technologies AG.

FIG. 6 shows a garment 60, and the placement of a piece of insulation material as part of the garment. Insulation material 22 is floating unattached to any of the fabric layers 12, 14 or 16. When the piece of garment is sewn to another piece of garment, like in shoulder seam 62 joining the front part to the back part the insulation material will be secured in its place in the garment making process by a garment maker.

In one embodiment the materials can be selected from groups which are fire retardand. FR-insulation can be used in potential fire hazardous area applications.

In these above embodiments there are described the use of laser-welded seams. It is also possible to use conventional seams which are made by stitching. Also the seams can be ultra sound welded seams or adhesive bonded seams.

Although the invention has been shown and described with respect to certain preferred embodiments, it is obvious that equivalents and modifications may occur to others skilled in the art upon the reading and understanding of these specifications. The present invention includes all such equivalents and modifications, and is limited only by the scope of the following claims.

LIST OF REFERENCE NUMERALS 10 insulation material
12 first fabric layer
14 second fabric layer
16 third intermediate fabric layer
18a-18n welding seams (lengthwise connections)
20a-20n bundle channels
22 insulation material
23 pressure roller
24a-24n welding stations
25a, 25b pressure
26 upper frame of machine
27 welding direction
28 lower frame
29 laser beam
30 upper guide elements
32 lower guide elements
34 upper fluting folder
36 lower fluting folder
38 laser source
40 welding machine
42a-42n multiplicities of conduits
44 intentionally blank
46 newly made insulation material storage roll
48 fabric storage roll
50 fabric storage roll
52 intermediate fabric storage roll
54 laser absorber
56 nozzles
58 nozzles
60 Garment
62 shoulder seam of garment

The invention claimed is:

1. A 3-layer insulation material comprising
a first fabric layer, a second fabric layer and a third fluted intermediate fabric layer between the first and the second fabric layers, the third fluted intermediate fabric layer being attached alternately to the first and the second fabric layer with longitudinal seams forming longitudinal bundle channels for insulation material, and
an individual insulation material bundle inside each longitudinal bundle channel,
wherein the longitudinal seams are laser welded seams and the first fabric layer and the second fabric layer are infrared radiation transparent fabric and the third fluted intermediate fabric layer is infrared radiation absorbing fabric.

2. The 3-layer insulation material of claim 1, wherein the third fluted intermediate fabric layer is made infrared absorbing by applying an infrared absorber on the third fluted intermediate fabric layer.

3. A method for producing a 3-layer insulation material comprising the steps of:
introducing a first fabric layer, a second fabric layer and a third fluted intermediate fabric layer between the first and the second fabric layers, the first fabric layer and the second fabric layer being infrared radiation transparent fabric and the third fluted intermediate fabric layer being infrared radiation absorbing fabric, and
attaching the third fluted intermediate fabric layer alternately to the first fabric layer and the second fabric layer to form a plurality of longitudinal bundle channels, wherein
the first fabric layer and the second fabric layer are attached to the third fluted intermediate fabric layer by laser welding.

4. The method for producing the 3-layer insulation material of claim 3, wherein simultaneously with the forming of said longitudinal bundle channels each bundle channel is filled with a separate insulation material bundle.

5. The method for producing the 3-layer insulation material of claim 3, wherein the third fluted intermediate fabric layer is made infrared radiation absorbing by applying an infrared absorber on the third fluted intermediate fabric layer.

* * * * *